US012686825B2

(12) United States Patent
Ghadimi et al.

(10) Patent No.: US 12,686,825 B2
(45) Date of Patent: Jul. 21, 2026

(54) PETROLEUM GAS (LPG) RECOVERY FROM GAS STREAMS

(71) Applicant: BORNA MEMBRANE SOLUTION INC., Toronto (CA)

(72) Inventors: Seyed Ali Ghadimi, Tehran (IR); Seyed Behrouz Sadatnia, Tehran (IR); Behrouz Salimi Beni, North York (CA); Behnam Salimi Beni, Shahrekord (IR); Sam Salimi Beni, North York (CA); Danial Salimi, Shahrekord (IR)

(73) Assignee: BORNA MEMBRANE SOLUTION INC. (CA)

( * ) Notice: Subject to any disclaimer, the term of this patent is extended or adjusted under 35 U.S.C. 154(b) by 312 days.

(21) Appl. No.: 18/700,727

(22) PCT Filed: May 15, 2023

(86) PCT No.: PCT/IB2023/054971
§ 371 (c)(1),
(2) Date: Apr. 12, 2024

(87) PCT Pub. No.: WO2024/236344
PCT Pub. Date: Nov. 21, 2024

(65) Prior Publication Data
US 2025/0235816 A1      Jul. 24, 2025

(51) Int. Cl.
*C10G 5/06*          (2006.01)
*B01D 53/22*          (2006.01)
(Continued)

(52) U.S. Cl.
CPC ............. *C10G 5/06* (2013.01); *B01D 53/226* (2013.01); *B01D 53/229* (2013.01); *C10G 5/00* (2013.01);
(Continued)

(58) Field of Classification Search
CPC .... C10G 5/00; C10G 5/05; C10L 3/12; C10L 2290/06; C10L 2290/10; C10L 2290/46; C10L 2290/543; C10L 2290/548
See application file for complete search history.

(56) References Cited

U.S. PATENT DOCUMENTS 4,857,078 A      8/1989   Watler
6,350,371 B1      2/2002   Lokhandwala et al.
(Continued)

*Primary Examiner* — Charles G Freay

(57) ABSTRACT

A process for recovery of $C_3^+$ form gas streams is disclosed. The process includes dividing a feed gas into a first $C_3^+$-rich stream with a higher content of $C_3^+$ and a first $C_1$-$C_2$-rich stream in a first membrane module, extracting remaining $C_3^+$ content in the first $C_1$-$C_2$-rich stream in a second membrane module and feeding the extracted $C_3^+$ content to the first membrane module, separating a separator-liquid $C_3^+$-rich stream with a higher content of $C_3^+$ than the first $C_3^+$-rich stream from the first $C_3^+$-rich stream in a separator, forming a bottoms $C_3^+$-rich stream with a higher content of $C_3^+$ than the separator-liquid $C_3^+$-rich stream in a distillation column and an associated reboiler using thermal energy of the feed gas, and increasing $C_3^+$ content of the bottoms $C_3^+$-rich stream by recovering $C_3^+$ content remaining in vapor phases of the separator and distillation column using a third membrane module.

19 Claims, 4 Drawing Sheets

160

(51) Int. Cl.
    C10G 5/00          (2006.01)
    C10L 3/12          (2006.01)

(52) U.S. Cl.
    CPC ............ C10L 3/12 (2013.01); *B01D 2256/24*
        (2013.01); *B01D 2257/7022* (2013.01); *C10L*
        *2290/06* (2013.01); *C10L 2290/10* (2013.01);
          *C10L 2290/46* (2013.01); *C10L 2290/543*
          (2013.01); *C10L 2290/548* (2013.01)

(56) References Cited

U.S. PATENT DOCUMENTS

| | | | | |
|---|---|---|---|---|
| 7,537,641 | B2 * | 5/2009 | Lokhandwala | ........... C10L 3/10 |
| | | | | 95/47 |
| 7,604,681 | B2 * | 10/2009 | Malsam | ................. B01D 71/44 |
| | | | | 95/47 |
| 7,799,964 | B2 | 9/2010 | Minhas et al. | |
| 8,618,344 | B2 | 12/2013 | Yadav et al. | |
| 11,866,667 | B2 * | 1/2024 | Ding | ..................... B01D 69/12 |
| 2019/0054415 | A1 * | 2/2019 | Maher | ..................... C10L 3/101 |

* cited by examiner

<u>100</u>

200

PETROLEUM GAS (LPG) RECOVERY FROM GAS STREAMS

TECHNICAL FIELD

The present application generally relates to recovery of liquefied petroleum gas (LPG) from a stream containing $C_1$, $C_2$ and $C_3^+$ hydrocarbons, and particularly, to a low-energy-consuming process for recovery of LPG with an ultralow concentration of $C_1$ and $C_2$ from a gas stream.

BACKGROUND

Liquefied petroleum gas (LPG) is a byproduct of natural gas and oil extraction, and crude oil refining. LPG contains $C_3$, $C_4$ and $C_3^+$ hydrocarbons and is used at the household level, as feedstock in petrochemical applications, and other industrial uses. Many processes have been developed for LPG recovery from gas streams. For example, M. Yadav et al. disclosed a patented process with U.S. Pat. No. 8,618,344 B2 for enhanced recovery of propylene and LPG from fuel gas produced in Fluid catalytic cracking unit by contacting a heavier hydrocarbon feed with FCC catalyst. In an exemplary process, $C_4$ and lighter components from unstabilized naphtha are first stripped off in a separate column to obtain a liquid fraction almost free from propylene (<0.1 mol %) and other LPG components. Such a stripped liquid fraction is used in an absorber to absorb higher amounts of propylene and LPG from fuel gas, leading to improved recovery of propylene. However, most of these processes are costly and highly energy intensive. Watler also disclosed a patented process with U.S. Pat. No. 4,857,078 for separating ethane and other higher hydrocarbons from a natural or produced gas stream, having methane as its major constituent using rubbery membranes. Lokhandwala et al. in another patented process with U.S. Pat. No. 6,350,371 B1 introduced an improved membrane based process and process train for catalytic reforming of hydrocarbons. The introduced process provides improved recovery of hydrogen and LPG, and reduces the amount of gas sent to the fuel line. Minhas et al. disclosed a patented process with U.S. Pat. No. 7,799,964 B2 for LPG recovery from various streams using a multiple membrane recovery process producing hydrogen stream at high yield and high purity and a $C_3^+$ LPG stream at high yield with low energy expenditure.

However, there is still a need for recovery of almost pure LPG from sources containing $C_3^+$ hydrocarbons. Moreover, there is a need for a cost-effective and more lower-energy-consuming process for recovery of LPG from a source containing $C_3^+$ hydrocarbons. Also, there is a need for a process for recovery of LPG with a desirable purity of LPG product.

SUMMARY

This summary is intended to provide an overview of the subject matter of this patent, and is not intended to identify essential elements or key elements of the subject matter, nor is it intended to be used to determine the scope of the claimed embodiments. The proper scope of this patent may be ascertained from the claims set forth below in view of the detailed description below and the drawings.

In one general aspect, the present disclosure is directed to a process for recovery of $C_3^+$ hydrocarbons form gas streams containing $C_1$, $C_2$ and $C_3^+$. The process may include compressing a feed gas containing $C_1$, $C_2$ and $C_3^+$ to a pressure in a range of 12 bar to 18 bar, adjusting a temperature of the compressed feed gas to a temperature in a range of 25° C. to 35° C., passing the compressed feed gas through a first membrane module, where the feed gas may be separated into a permeate stream comprising the first $C_3^+$-rich stream with a higher content of $C_3^+$ than the feed gas and a retentate stream comprising a first $C_1$- and $C_2$-rich stream, extracting a remaining amount of $C_3^+$ in the first $C_1$- and $C_2$-rich stream by passing the first $C_1$- and $C_2$-rich stream through a second membrane module, where a second $C_3^+$-rich stream may be generated, and recycling the second $C_3^+$-rich stream to the feed gas line, compressing the first $C_3^+$-rich stream to a pressure in a range of 12 bar to 18 bar, forming a two-phase stream by cooling the compressed first $C_3^+$-rich stream to a temperature in a range of 25° C. to 35° C., separating the two-phase stream to a separator-liquid $C_3^+$-rich stream and a vapor phase in a separator unit, and forming a bottoms $C_3^+$-rich stream with a higher content of $C_3^+$ than the separator-liquid $C_3^+$-rich stream by removing volatile compounds from the separator-liquid $C_3^+$-rich stream in a distillation column.

In an exemplary embodiment, passing the compressed feed gas through the first membrane module may include feeding the compressed feed gas to the first membrane module, retrieving the permeate stream comprising the first $C_3^+$-rich stream from the first membrane module, and retrieving the retentate stream comprising the first $C_1$- and $C_2$-rich stream from the first membrane module. In an exemplary embodiment, the first $C_1$- and $C_2$-rich stream may include a higher content of $C_1$ and $C_2$ than the feed gas.

In an exemplary embodiment, extracting the remaining amount of $C_3^+$ in the first $C_1$- and $C_2$-rich stream may include feeding the first $C_1$- and $C_2$-rich stream to the second membrane module, retrieving a retentate stream comprising a second $C_1$- and $C_2$-rich stream from the second membrane module and retrieving a second $C_3^+$-rich stream comprising a permeate stream from the second membrane module, and recycling the second $C_3^+$-rich stream to feed line of the first membrane module. In an exemplary embodiment, the second $C_1$- and $C_2$-rich stream may include a higher content of $C_1$ and $C_2$ than the first $C_1$- and $C_2$-rich stream.

In an exemplary embodiment, the two-phase stream generated from first $C_3^+$-rich stream may include a vapor-liquid $C_3^+$-rich stream. In an exemplary embodiment, forming the separator-liquid $C_3^+$-rich stream may include separating the liquid phase of the two-phase stream from the vapor phase of the two-phase stream in the separator unit at a constant temperature in a range of 25° C. to 35° C. In an exemplary embodiment, the separator-liquid $C_3^+$-rich stream may include the liquid phase of the two-phase stream with a higher content of $C_3^+$ than the first $C_3^+$-rich stream.

In an exemplary embodiment, forming the bottoms $C_3^+$-rich stream with the higher content of $C_3^+$ than the separator-liquid $C_3^+$-rich stream by removing volatile compounds from the separator-liquid $C_3^+$-rich stream may include feeding the separator-liquid $C_3^+$-rich stream to a distillation column, performing a distillation process inside the distillation column using a reboiler unit, and obtaining the bottoms $C_3^+$-rich stream by withdrawing a liquid flow from the reboiler unit. In an exemplary embodiment, performing the distillation process inside the distillation column may include withdrawing a liquid stream from bottom side of the distillation column, generating a vapor flow by heating the withdrawn liquid stream in the reboiler unit to a temperature in a range of 55° C. to 75° C., and returning the generated vapor flow to the distillation column. In an exemplary embodiment, the vapor flow may include the volatile compounds of the separator-liquid $C_3^+$-rich stream. In an exemplary embodiment, the liquid flow withdrawn from the reboiler unit may include non-volatile compounds of the separator-liquid $C_3^+$-rich stream with a higher content of $C_3^+$ than the separator-liquid $C_3^+$-rich stream.

In an exemplary embodiment, adjusting the temperature of the compressed feed gas may include a primary cooling the compressed feed gas stream in the reboiler unit by transferring thermal energy of the compressed feed gas to the withdrawn liquid stream in the reboiler unit via passing the compressed feed gas through a hot side of the reboiler unit, and adjusting the temperature of the compressed feed gas at a temperature in the range of 25° C. to 35° C. by further cooling the compressed feed gas in a heat exchanger unit using a coolant fluid.

In an exemplary embodiment, recycling the second $C_3^+$-rich stream to feed line of the first membrane module may include compressing the second $C_3^+$-rich stream to a pressure in a range of 12 bar to 18 bar, adjusting a temperature of the compressed second $C_3^+$-rich stream to a temperature in a range of 25° to 35° C., and feeding the compressed second $C_3^+$-rich stream to the first membrane module. In an exemplary embodiment, recycling the second $C_3^+$-rich stream to the first membrane module may include mixing the second $C_3^+$-rich stream with the feed gas before compressing the feed gas.

In an exemplary embodiment, forming the two-phase stream may include passing the compressed first $C_3^+$-rich stream through a heat exchanger unit and reducing the temperature of the compressed first $C_3^+$-rich stream to the temperature in the range of 25° C. to 35° C. in the heat exchanger unit using a coolant fluid.

In an exemplary embodiment, separating the liquid phase of the two-phase stream from the vapor phase of the two-phase stream in the separator unit may include feeding the two-phase stream to the separator unit, withdrawing the liquid phase of the two-phase stream from bottom of the separator unit, and withdrawing the vapor phase of the two-phase stream from top of the separator unit. In an exemplary embodiment, the vapor phase of the two-phase stream may include a higher content of $C_1$ and $C_2$ than the first $C_3^+$-rich stream. In an exemplary embodiment, a temperature of the separator unit may be at a constant temperature in the range of 25° C. to 35° C. equal to a temperature of the two-phase stream.

In an exemplary embodiment, the process may further include recovering a $C_3^+$ content remaining in the vapor phase of the two-phase stream and a vapor outlet from top of the distillation column. In an exemplary embodiment, recovering the $C_3^+$ content remaining in the vapor phase of the two-phase stream and the vapor outlet from top of the distillation column may include forming an overhead stream by mixing the vapor phase of the two-phase stream and the vapor outlet from top of the distillation column, feeding the overhead stream to a third membrane module, and recycling a permeate stream from the third membrane module to feed line of the first membrane module. In an exemplary embodiment, the permeate stream from the third membrane module may include a higher content of $C_3^+$ than each of the vapor phase of the two-phase stream and the vapor outlet from top of the distillation column. In an exemplary embodiment, recycling the permeate stream from the third membrane module to the first membrane module may include compressing the permeate stream from the third membrane module to a pressure in a range of 12 bar to 18 bar, adjusting a temperature of the compressed permeate stream from the third membrane module to a temperature in a range of 25° C. to 35° C., and feeding the compressed permeate stream from the third membrane module to feed line of the first membrane module. In an exemplary embodiment, recycling the permeate stream from the third membrane module to the first membrane module may include mixing the permeate stream from the third membrane module with the feed gas before compressing the feed gas.

In an exemplary embodiment, an exemplary process may be done iteratively in a cycle up to obtain a content of $C_1$ and $C_2$ in a range of 0.5% to 10% in an exemplary bottoms $C_3^+$-rich stream withdrawn from an exemplary reboiler unit. In an exemplary embodiment, the process may further include retrieving a retentate stream from the third membrane module comprising a third $C_1$- and $C_2$-rich stream. In an exemplary embodiment, the third $C_1$- and $C_2$-rich stream may include a higher content of $C_1$ and $C_2$ than the overhead stream. In an exemplary embodiment, the process may further include forming a $C_1$- and $C_2$-rich product stream by mixing the second $C_1$- and $C_2$-rich stream and the third $C_1$- and $C_2$-rich stream.

In an exemplary embodiment, passing the compressed feed gas through the first membrane module may include passing the compressed feed gas stream through a set of rubbery polymer membranes placed sequentially after each other. In an exemplary embodiment, feeding the first $C_1$- and $C_2$-rich stream to the second membrane module may include feeding the first $C_1$- and $C_2$-rich stream to a set of rubbery polymer membranes placed sequentially after each other. In an exemplary embodiment, feeding the overhead stream to the third membrane module may include feeding the overhead stream to a set of rubbery polymer membranes placed sequentially after each other.

BRIEF DESCRIPTION OF THE DRAWINGS

The drawing figures depict one or more embodiments in accord with the present teachings, by way of example only, not by way of limitation. In the figures, like reference numerals refer to the same or similar elements.

DETAILED DESCRIPTION

Figure 1A:
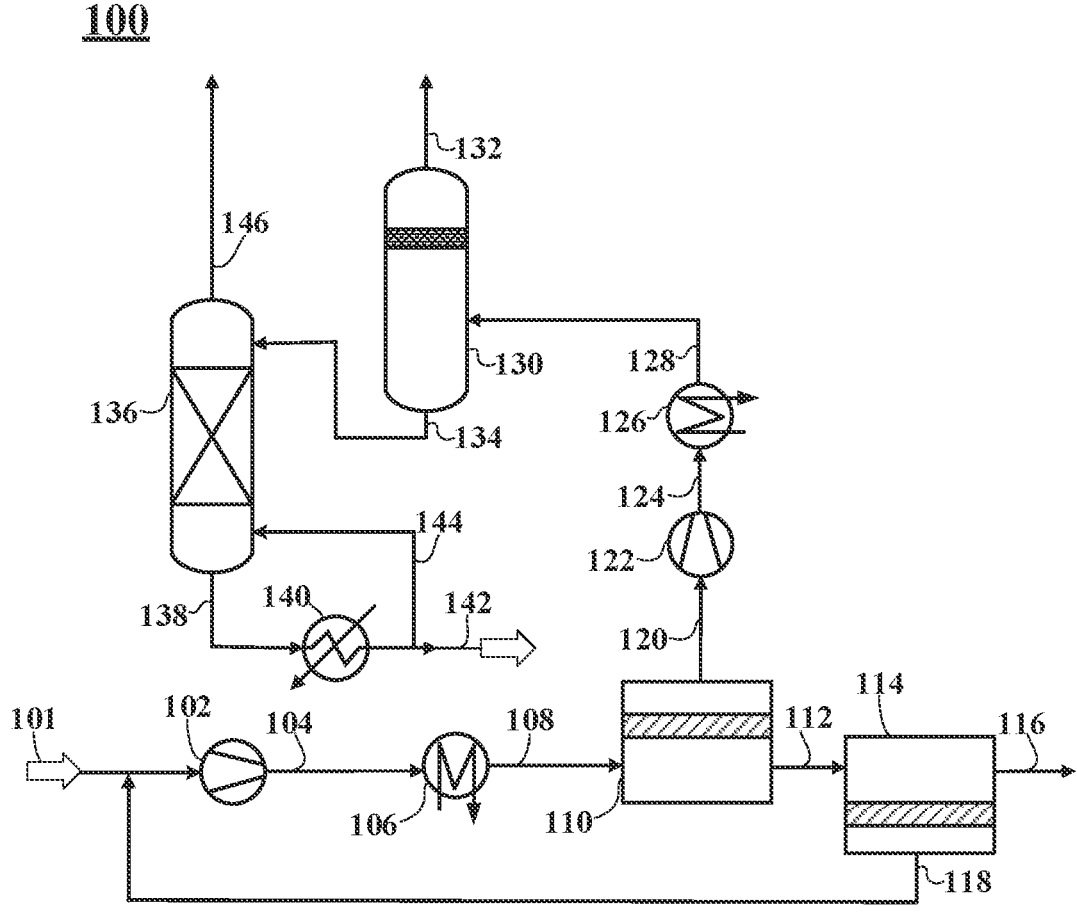
FIG. 1A shows a schematic drawing of an exemplary primary process for recovery of $C_3^+$ hydrocarbons form an exemplary feed gas, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary embodiments will be readily apparent to one skilled in the art, and the general principles defined herein may be applied to other embodiments and applications without departing from the scope of the present disclosure. The present disclosure is not intended to be limited to the embodiments shown, but is to be accorded the widest possible scope consistent with the principles and features disclosed herein.

In an exemplary embodiment of the present disclosure, a process for recovery of $C_3^+$ hydrocarbons form gas streams containing $C_1$, $C_2$ and $C_3^+$ is disclosed. In an exemplary embodiment, an exemplary process may include compressing a feed gas containing $C_1$, $C_2$ and $C_3^+$ to a pressure in a range of 12 bar to 18 bar, adjusting a temperature of an exemplary compressed feed gas to a temperature in a range of 25° C. to 35° C., forming a first $C_3^+$-rich stream with a higher content of $C_3^+$ than the feed gas by passing an exemplary compressed feed gas at an exemplary adjusted temperature through a first membrane module via separating an exemplary compressed feed gas at an exemplary adjusted temperature into a permeate stream including a first $C_3^+$-rich stream and a retentate stream including a first $C_1$- and $C_2$-rich stream, recycling a remaining amount of $C_3^+$ in an exemplary first $C_1$- and $C_2$-rich stream by enriching an exemplary first $C_1$- and $C_2$-rich stream in a second membrane module, compressing an exemplary first $C_3^+$-rich stream to a pressure in a range of 12 bar to 18 bar, forming a two-phase stream by cooling an exemplary compressed first $C_3^+$-rich stream to a temperature in a range of 25° C. to 35° C., separating an exemplary two-phase stream to a separator-liquid $C_3^+$-rich stream comprising a liquid phase of an exemplary two-phase stream and a vapor phase of an exemplary two-phase stream in a separator unit, and forming a bottoms $C_3^+$-rich stream with a higher content of $C_3^+$ than an exemplary separator-liquid $C_3^+$-rich stream by removing volatile compounds from an exemplary separator-liquid $C_3^+$-rich stream in a distillation column.

In an exemplary embodiment, passing an exemplary compressed feed gas through an exemplary first membrane module may include feeding an exemplary compressed feed gas to an exemplary first membrane module, retrieving an exemplary permeate stream including an exemplary first $C_3^+$-rich stream from an exemplary first membrane module, and retrieving an exemplary retentate stream including an exemplary first $C_1$- and $C_2$-rich stream from an exemplary first membrane module. In an exemplary embodiment, an exemplary first $C_1$- and $C_2$-rich stream may include a higher content of $C_1$ and $C_2$ than the feed gas.

In an exemplary embodiment, recycling an exemplary remaining amount of $C_3^+$ in an exemplary first $C_1$- and $C_2$-rich stream by enriching an exemplary first $C_1$- and $C_2$-rich stream in an exemplary second membrane module may include feeding an exemplary first $C_1$- and $C_2$-rich stream to an exemplary second membrane module, retrieving a retentate stream including a second $C_1$- and $C_2$-rich stream from an exemplary second membrane module, and recycling a permeate stream from an exemplary second membrane module to the first membrane module. In an exemplary embodiment, an exemplary second $C_1$- and $C_2$-rich stream may include a higher content of $C_1$ and $C_2$ than an exemplary first $C_1$- and $C_2$-rich stream.

In an exemplary embodiment, an exemplary two-phase stream may include a vapor-liquid $C_3^+$-rich stream. In an exemplary embodiment, forming an exemplary separator-liquid $C_3^+$-rich stream may include separating an exemplary liquid phase of an exemplary two-phase stream from an exemplary vapor phase of an exemplary two-phase stream in an exemplary separator unit at a constant temperature in a range of 25° C. to 35° C. In an exemplary embodiment, an exemplary separator-liquid $C_3^+$-rich stream may include an exemplary liquid phase of an exemplary two-phase stream with a higher content of $C_3^+$ than an exemplary first $C_3^+$-rich stream.

In an exemplary embodiment, forming an exemplary bottoms $C_3^+$-rich stream with an exemplary higher content of $C_3^+$ than an exemplary separator-liquid $C_3^+$-rich stream by removing volatile compounds from an exemplary separator-liquid $C_3^+$-rich stream may include feeding an exemplary separator-liquid $C_3^+$-rich stream to a distillation column, performing a distillation process in an exemplary distillation column utilizing a reboiler unit, and obtaining an exemplary bottoms $C_3^+$-rich stream by withdrawing a liquid flow from an exemplary reboiler unit. In an exemplary embodiment, performing an exemplary distillation process in an exemplary distillation column may include withdrawing a liquid stream from bottom of an exemplary distillation column, generating a vapor flow by heating an exemplary withdrawn liquid stream in an exemplary reboiler unit to a temperature in a range of 55° C. to 75° C., and returning an exemplary generated vapor flow to an exemplary distillation column. In an exemplary embodiment, an exemplary vapor flow may include an exemplary volatile compound of an exemplary separator-liquid $C_3^+$-rich stream. In an exemplary embodiment, an exemplary liquid flow withdrawn from an exemplary reboiler unit may include non-volatile compounds of an exemplary separator-liquid $C_3^+$-rich stream with a higher content of $C_3^+$ than an exemplary separator-liquid $C_3^+$-rich stream.

In an exemplary embodiment, adjusting an exemplary temperature of an exemplary compressed feed gas may include cooling an exemplary compressed feed gas in an exemplary reboiler unit. In an exemplary embodiment, cooling an exemplary compressed gas stream may include transferring thermal energy of an exemplary compressed feed gas to an exemplary withdrawn liquid stream in an exemplary reboiler unit by passing an exemplary compressed feed gas through an exemplary reboiler unit. In an exemplary embodiment, adjusting an exemplary temperature of an exemplary compressed feed gas may further include cooling an exemplary compressed feed gas in a heat exchanger unit to a temperature of 25° C. to 35° C.

In an exemplary embodiment, adjusting an exemplary temperature of an exemplary compressed feed gas may include two step cooling an exemplary compressed feed gas stream, firstly decreasing temperature of an exemplary compressed feed gas in an exemplary reboiler unit by transferring thermal energy of an exemplary compressed feed gas to an exemplary withdrawn liquid stream in an exemplary reboiler unit via passing an exemplary compressed feed gas through an exemplary reboiler unit, and secondly, adjusting an exemplary temperature of an exemplary compressed feed gas at a temperature in an exemplary range of 25° C. to 35° C. by further cooling an exemplary compressed feed gas in a heat exchanger unit using a coolant fluid.

In an exemplary embodiment, recycling an exemplary permeate stream from an exemplary second membrane module to an exemplary first membrane module may include compressing an exemplary permeate stream from an exemplary second membrane module to a pressure in a range of 12 bar to 18 bar, adjusting a temperature of an exemplary compressed permeate stream from an exemplary second membrane module to a temperature in a range of 25° C. to 35° C., and feeding an exemplary compressed permeate stream from an exemplary second membrane module to an exemplary first membrane module. In an exemplary embodiment, recycling an exemplary permeate stream from an exemplary second membrane module to an exemplary first membrane module may include mixing an exemplary permeate stream from an exemplary second membrane module with an exemplary feed gas before compressing an exemplary feed gas.

In an exemplary embodiment, forming an exemplary two-phase stream may include passing an exemplary compressed first $C_3^+$-rich stream through a heat exchanger unit and reducing an exemplary temperature of an exemplary compressed first $C_3^+$-rich stream to an exemplary temperature in an exemplary range of 25° C. to 35° C. in an exemplary heat exchanger unit using a coolant fluid.

In an exemplary embodiment, separating an exemplary liquid phase of an exemplary two-phase stream from an exemplary vapor phase of an exemplary two-phase stream in an exemplary separator unit may include feeding an exemplary two-phase stream to an exemplary separator unit, withdrawing an exemplary liquid phase of an exemplary two-phase stream from bottom of an exemplary separator unit, and withdrawing an exemplary vapor phase of an exemplary two-phase stream from top of an exemplary separator unit. In an exemplary embodiment, an exemplary vapor phase of an exemplary two-phase stream may include a higher content of $C_1$ and $C_2$ than an exemplary first $C_3^+$-rich stream. In an exemplary embodiment, an exemplary separator unit may operate at an exemplary constant temperature in an exemplary range of 25° C. to 35° C. equal to a temperature of an exemplary two-phase stream.

In an exemplary embodiment, an exemplary process may further include recovering a $C_3^+$ content remaining in an exemplary vapor phase of an exemplary two-phase stream and a vapor outlet from top of an exemplary distillation column. In an exemplary embodiment, recovering an exemplary $C_3^+$ content remaining in an exemplary vapor phase of an exemplary two-phase stream and an exemplary vapor outlet from top of an exemplary distillation column may include forming an overhead stream by mixing an exemplary vapor phase of an exemplary two-phase stream and an exemplary vapor outlet from top of an exemplary distillation column, feeding an exemplary overhead stream to a third membrane module, and recycling a permeate stream from an exemplary third membrane module to an exemplary first membrane module. In an exemplary embodiment, an exemplary permeate stream from an exemplary third membrane module may include a higher content of $C_3^+$ than each of an exemplary vapor phase of an exemplary two-phase stream and an exemplary vapor outlet from top of an exemplary distillation column. In an exemplary embodiment, recycling an exemplary permeate stream from an exemplary third membrane module to an exemplary first membrane module may include compressing an exemplary permeate stream from an exemplary third membrane module to a pressure in a range of 12 bar to 18 bar, adjusting a temperature of an exemplary compressed permeate stream from an exemplary third membrane module to a temperature in a range of 25° C. to 35° C., and feeding an exemplary compressed permeate stream from an exemplary third membrane module to an exemplary first membrane module. In an exemplary embodiment, recycling an exemplary permeate stream from an exemplary third membrane module to an exemplary first membrane module may include mixing an exemplary permeate stream from an exemplary third membrane module with an exemplary feed gas before compressing an exemplary feed gas.

In an exemplary embodiment, an exemplary process may further include retrieving a retentate stream from an exemplary third membrane module comprising a third $C_1$- and $C_2$-rich stream. In an exemplary embodiment, an exemplary third $C_1$- and $C_2$-rich stream may include a higher content of $C_1$ and $C_2$ than an exemplary overhead stream. In an exemplary embodiment, an exemplary process may further include forming a $C_1$- and $C_2$-rich product stream by mixing an exemplary second $C_1$- and $C_2$-rich stream and an exemplary third $C_1$- and $C_2$-rich stream. In an exemplary embodiment, an exemplary process may be done iteratively in a cycle up to obtain a content of $C_1$ and $C_2$ in a range of 0.5% to 10% in an exemplary bottoms $C_3^+$-rich stream withdrawn from an exemplary reboiler unit.

In an exemplary embodiment, passing an exemplary compressed feed gas through an exemplary first membrane module may include passing an exemplary compressed feed gas stream through a set of rubbery polymer membranes placed sequentially after each other. In an exemplary embodiment, feeding an exemplary first $C_1$- and $C_2$-rich stream to an exemplary second membrane module may include feeding an exemplary first $C_1$- and $C_2$-rich stream to a set of rubbery polymer membranes placed sequentially after each other. In an exemplary embodiment, feeding an exemplary overhead stream to an exemplary third membrane module may include feeding an exemplary overhead stream to a set of rubbery polymer membranes placed sequentially after each other.

As used herein, each of $C_1$, $C_2$, $C_3$, and so on may refer to hydrocarbons and their derivatives having carbon atoms equal to the subscript carbon number. For example, $C_1$ refers to a hydrocarbon having one carbon atom in its compound (i.e., methane). Accordingly, $C_3$ refers to hydrocarbons with three or more carbon atoms in their formulation. In an exemplary embodiment, liquefied petroleum gas (LPG) may include $C_3^+$, mainly, $C_3^+$ and $C_4$, and less amount of $C_5$ and higher hydrocarbons.

FIG. 1A shows a schematic view of a primary process 100 for recovery of $C_3$ hydrocarbons form a feed gas 101, consistent with one or more exemplary embodiments of the present disclosure. Exemplary process 100 may include performing three main steps of enriching feed gas 101 in $C_3^+$ iteratively in a cycle up to obtaining a target concentration of $C_3^+$ in a product $C_3^+$ stream. In an exemplary embodiment, process 100 may include forming a first $C_3^+$-rich stream 120 with a higher content of $C_3^+$ than feed gas 101 by removing a first amount of $C_1$ and $C_2$ hydrocarbons from feed gas 101 in a first membrane module 110, forming a separator-liquid $C_3^+$-rich stream 134 with a higher content of $C_3^+$ than first $C_3^+$-rich stream 120 by removing a second amount of $C_1$ and $C_2$ hydrocarbons from first $C_3^+$-rich stream 120 in a separator unit 130, and forming a bottoms $C_3^+$-rich stream 142 with a higher content of $C_3^+$ than separator-liquid $C_3^+$-rich stream 134 by removing a third amount of $C_1$ and $C_2$ hydrocarbons from separator-liquid $C_3^+$-rich stream 134 in a distillation column 136 and associated reboiler unit 140.

In an exemplary embodiment, feed gas 101 may include a gas stream containing hydrocarbons. In an exemplary embodiment, feed gas 101 may include a gas stream containing $C_1$, $C_2$ and $C_3^+$ hydrocarbons. In an exemplary embodiment, feed gas 101 may include a gas stream containing light hydrocarbons (i.e., $C_1$ and $C_2$ hydrocarbons) and heavy hydrocarbons (i.e., $C_3^+$ hydrocarbons). In an exemplary embodiment, $C_3^+$ hydrocarbons may refer to liquefied petroleum gas (LPG). In an exemplary embodiment, feed gas 101 may include a hydrocarbon source stream. In an exemplary embodiment, feed gas 101 may include a hydrocarbon-containing stream formed or obtained as a byproduct of a process of at least one of natural gas production, oil extraction, crude oil refining, and combinations thereof. In an exemplary embodiment, feed gas 101 may include a gas stream produced in a refinery process. In an exemplary embodiment, feed gas 101 may include a fuel gas stream.

With further detail in regards to step of forming a first $C_3^+$-rich stream 120 with a higher content of $C_3^+$ than feed gas 101, a first amount of $C_1$ and $C_2$ hydrocarbons may be separated from feed gas 101 via steps of compressing feed gas 101 to a pressure in a range of about 12 bar to 18 bar in a first compressor 102, adjusting a temperature of compressed feed gas 104 by cooling compressed feed gas 104 in a first heat exchanger 106, and separating cooled compressed feed gas 108 at a temperature of about 25° C. to about 35° C. into first $C_3^+$-rich stream 120 and a first $C_1$- and $C_2$-rich stream 112 in first membrane module 110.

In an exemplary embodiment, feed gas 101 may be fed to first compressor 102; thereby, resulting in forming compressed feed gas 104 with a pressure in a range of about 12 bar to 18 bar. In an exemplary embodiment, feed gas 101 may be compressed to a pressure of about 15 bar. In an exemplary embodiment, compressed feed gas 104 may be fed to first heat exchanger 106, where a temperature of compressed feed gas 104 may be adjusted to a temperature in a range of about 25° C. to about 35° C. by cooling compressed feed gas 104 in first heat exchanger 106. In an exemplary embodiment, compressed feed gas 104 may be cooled to a temperature of about 30° C. in first heat exchanger 106. In an exemplary embodiment, compressed feed gas 104 may be cooled in first heat exchanger 106 using a coolant fluid. In an exemplary embodiment, an exemplary coolant fluid may include air or water. In an exemplary embodiment, first heat exchanger 106 may include a water-cooled heat exchanger or an air-cooled heat exchanger.

Furthermore, cooled compressed feed gas 108 may be fed to first membrane module 110 where cooled compressed feed gas 108 may be contacted with a membrane capable of separating $C_3^+$ hydrocarbons from $C_1$ and $C_2$ hydrocarbons. In an exemplary embodiment, cooled compressed feed gas 108 may be contacted with a rubbery polymer membrane. In an exemplary embodiment, cooled compressed feed gas 108 may be fed to first membrane module 110 at a pressure of about 15 bar and a temperature of about 30° C. In an exemplary embodiment, cooled compressed feed gas 108 may be divided into first $C_3^+$-rich stream 120 and first $C_1$- and $C_2$-rich stream 112. In an exemplary embodiment, first $C_3^+$-rich stream 120 may be a $C_3^+$-enriched permeate stream and first $C_1$- and $C_2$-rich stream 112 may be a $C_1$ and $C_2$ enriched retentate stream. In an exemplary embodiment, first $C_3^+$-rich stream 120 may have a higher content of $C_3^+$ than feed gas 101. In an exemplary embodiment, first $C_3^+$-rich stream 120 may be formed by passing cooled compressed feed gas 108 through first membrane module 110. In an exemplary embodiment, passing cooled compressed feed gas 108 through first membrane module 110 may include feeding cooled compressed feed gas 108 to first membrane module 110, retrieving a permeate stream comprising first $C_3^+$-rich stream 120 from first membrane module 110, and retrieving a retentate stream comprising a first $C_1$- and $C_2$-rich stream 112 from first membrane module 110. In an exemplary embodiment, first $C_1$- and $C_2$-rich stream 112 may include a higher content of $C_1$ and $C_2$ than feed gas 101.

In an exemplary embodiment, first $C_1$- and $C_2$-rich stream 112 may be further enriched in $C_1$ and $C_2$ hydrocarbons and a remaining content of $C_3^+$ hydrocarbons in first $C_1$- and $C_2$-rich stream 112 may be recovered by passing first $C_1$- and $C_2$-rich stream 112 through a second membrane module 114. In an exemplary embodiment, first $C_1$- and $C_2$-rich stream 112 may be fed to second membrane module 114 where first $C_1$- and $C_2$-rich stream 112 may be divided into a retentate stream comprising a second $C_1$- and $C_2$-rich stream 116 and a permeate stream comprising a second $C_3^+$-rich stream 118. In an exemplary embodiment, second $C_3^+$-rich stream 118 may include a remaining amount of $C_3^+$ hydrocarbons in first $C_1$- and $C_2$-rich stream 112. In an exemplary embodiment, second $C_1$- and $C_2$-rich stream 116 may include a higher content of $C_1$ and $C_2$ than first $C_1$- and $C_2$-rich stream 112. In an exemplary embodiment, second $C_3^+$-rich stream 118 may be retrieved from second membrane module 114 and may be recycled to first membrane module 110, leading to obtaining a more purified stream of $C_1$ and $C_2$ hydrocarbons comprising second $C_1$- and $C_2$-rich stream 116 and increasing a $C_3^+$ content of first $C_3^+$-rich stream 120 by recovering second $C_3^+$-rich stream 118 comprising remaining amount of $C_3^+$ hydrocarbons in first $C_1$- and $C_2$-rich stream 112. In an exemplary embodiment, surface area of second membrane module 114 may control an exemplary amount of $C_3^+$ hydrocarbons recovered in second $C_3^+$-rich stream 118. In more detail, a pressure of first $C_1$- and $C_2$-rich stream 112 may be controlled/adjusted by first compressor 102 and a temperature of first $C_1$- and $C_2$-rich stream 112 may be controlled/adjusted by first heat exchanger 106. Therefore, increasing a surface area of second membrane module 114 may increase a stage cut ratio, which may lead to an increase of volume flow rate of second $C_3^+$-rich stream 118 compared to first $C_1$- and $C_2$-rich stream 112; thereby, resulting in increasing an amount of $C_3^+$ recovery in whole exemplary process. Furthermore, another consequence of this may be an increase of concentration of $C_1$ in second $C_1$- and $C_2$-rich stream 116.

In an exemplary embodiment, recovering second $C_3^+$-rich stream 118 may include recycling second $C_3^+$-rich stream 118 to first membrane module 110. In an exemplary embodiment, recycling second $C_3^+$-rich stream 118 to first membrane module 110 may include compressing second $C_3^+$-rich stream 118 to a pressure in a range of 12 bar to 18 bar, adjusting a temperature of compressed second $C_3^+$-rich stream 118 to a temperature in a range of about 25° C. to about 35° C., and feeding compressed second $C_3^+$-rich stream 118 at adjusted temperature to first membrane module 110. In an exemplary embodiment, recycling second $C_3^+$-rich stream 118 to first membrane module 110 may include mixing second $C_3^+$-rich stream 118 retrieved from second membrane module 114 with feed gas 101; thereby, second $C_3^+$-rich stream 118 may be compressed in first compressor 102 to a pressure in a range of 12 bar to 18 bar and cooled to a temperature in a range of about 25° C. to about 35° C. in first heat exchanger 106 along with feed gas 101.

In an exemplary embodiment, second $C_1$- and $C_2$-rich stream 116 may be withdrawn from second membrane module 114 as a product stream mainly enriched in $C_1$ hydrocarbons. In an exemplary embodiment, second $C_1$- and $C_2$-rich stream 116 may be used for domestic consumption and/or consuming as a fuel gas for process units, for example, boilers, etc.

Furthermore, first $C_3^+$-rich stream 120 may be more purified relative to $C_3^+$ compounds by removing remaining light $C_1$ and $C_2$ compounds in first $C_3^+$-rich stream 120 via a two-phase forming process. In an exemplary embodiment, first $C_3^+$-rich stream 120 may be more enriched in $C_3^+$ leading to form separator-liquid $C_3^+$-rich stream 134 with a higher content of $C_3^+$ than first $C_3^+$-rich stream 120 by removing a remaining amount of $C_1$ and $C_2$ hydrocarbons from first $C_3^+$-rich stream 120. In an exemplary embodiment, forming separator-liquid $C_3^+$-rich stream 134 may include compressing first $C_3^+$-rich stream 120 to a pressure in a range of about 12 bar to about 18 bar, forming a two-phase stream 128 by cooling compressed first $C_3^+$-rich stream 124, and separating a liquid phase of two-phase stream 128 in a separator unit 130.

In details, forming two-phase stream 128 may include passing compressed first $C_3^+$-rich stream 124 through a second heat exchanger 126 and reducing temperature of compressed first $C_3^+$-rich stream 124 to a temperature in a range of about 25° C. to about 35° C. in second heat exchanger 126 using a coolant fluid. In an exemplary embodiment, an exemplary coolant fluid may include air or water. In an exemplary embodiment, second heat exchanger 126 may include a water-cooled heat exchanger or an air-cooled heat exchanger. In an exemplary embodiment, first $C_3^+$-rich stream 120 may be compressed in a second compressor 122 to a pressure of about 15 bar, leading to forming compressed first $C_3^+$-rich stream 124. In an exemplary embodiment, compressed first $C_3^+$-rich stream 124 may be cooled to a temperature in a range of about 25° C. to about 35° C. in second heat exchanger 126; thereby, two-phase stream 128 may be formed. In an exemplary embodiment, two-phase stream 128 may be formed by cooling compressed first $C_3^+$-rich stream 124 to a temperature of about 30° C. In an exemplary embodiment, two-phase stream 128 may comprise a vapor-liquid $C_3^+$-rich stream. Furthermore, separator-liquid $C_3^+$-rich stream 134 may be formed by separating a liquid phase of two-phase stream 128 from a vapor phase 132 of two-phase stream 128. In an exemplary embodiment, liquid phase of two-phase stream 128 may comprise separator-liquid $C_3^+$-rich stream 134. In an exemplary embodiment, separator-liquid $C_3^+$-rich stream 134 may be separated as an exemplary liquid phase of two-phase stream 128 from vapor phase 132 of two-phase stream 128 in separator unit 130 at a constant temperature in a range of about 25° C. to about 35° C. In an exemplary embodiment, separator-liquid $C_3^+$-rich stream 134 may comprise an exemplary liquid phase of two-phase stream 128 with a higher content of $C_3^+$ than first $C_3^+$-rich stream 120. In an exemplary embodiment, separating separator-liquid $C_3^+$-rich stream 134 as an exemplary liquid phase of two-phase stream 128 from vapor phase 132 of two-phase stream 128 may include feeding two-phase stream 128 to separator unit 130, withdrawing liquid phase of two-phase stream 128 (separator-liquid $C_3^+$-rich stream 134) from bottom side of separator unit 130, and withdrawing vapor phase 132 of two-phase stream 128 from top of separator unit 130. In an exemplary embodiment, vapor phase 132 of two-phase stream 128 may include a higher content of $C_1$ and $C_2$ than first $C_3^+$-rich stream 120. In an exemplary embodiment, a temperature of separator unit 130 may include a constant temperature in a range of about 25° C. to about 35° C., for example, a constant temperature of about 30° C. In an exemplary embodiment, a temperature of separator unit 130 may be equal to a temperature of two-phase stream 128 entered from second heat exchanger 126 to separator unit 130.

Additionally, separator-liquid $C_3^+$-rich stream 134 may be more enriched in CU compounds in distillation column 136. In an exemplary embodiment, bottoms $C_3^+$-rich stream 142 with a higher content of $C_3^+$ than separator-liquid $C_3^+$-rich stream 134 may be formed by removing a remaining amount of $C_1$ and $C_2$ hydrocarbons in separator-liquid $C_3^+$-rich stream 134 in distillation column 136 and associated reboiler unit 140. In an exemplary embodiment, bottoms $C_3^+$-rich stream 142 may be formed by removing volatile light compounds from separator-liquid $C_3^+$-rich stream 134. In an exemplary embodiment, forming bottoms $C_3^+$-rich stream 142 may include feeding separator-liquid $C_3^+$-rich stream 134 to distillation column 136, performing a distillation process in distillation column 136 using a reboiler unit 140, and obtaining bottoms $C_3^+$-rich stream 142 as a withdrawn liquid flow from reboiler unit 140. In an exemplary embodiment, performing an exemplary distillation process inside distillation column 136 may include withdrawing a liquid stream 138 from bottom of distillation column 136, generating a vapor flow 144 by heating withdrawn liquid stream 138 in reboiler unit 140 to a temperature in a range of about 55° C. to about 75° C., and returning generated vapor flow 144 to distillation column 136. In an exemplary embodiment, vapor flow 144 may mainly include volatile compounds of separator-liquid $C_3^+$-rich stream 134. In an exemplary embodiment, vapor flow 144 may drive an exemplary distillation process in distillation column 136, leading to separating light compounds of separator-liquid $C_3^+$-rich stream 134 in form of vapor outlet 146 withdrawn from top of distillation column 136 and heavy compounds of separator-liquid $C_3^+$-rich stream 134 in form of liquid stream 138 from bottom of distillation column 136. In an exemplary embodiment, vapor outlet 146 may mainly include $C_1$ and $C_2$ compounds with a higher content of $C_1$ and $C_2$ than separator-liquid $C_3^+$-rich stream 134.

In an exemplary embodiment, bottoms $C_3^+$-rich stream 142 may comprise a liquid flow enriched in $C_3^+$ exited from reboiler unit 140. In an exemplary embodiment, bottoms $C_3^+$-rich stream 142 may mainly include non-volatile compounds of the separator-liquid $C_3^+$-rich stream. In an exemplary embodiment, bottoms $C_3^+$-rich stream 142 may have a higher content of $C_3^+$ than separator-liquid $C_3^+$-rich stream 134. In an exemplary embodiment, bottoms $C_3^+$-rich stream 142 may comprise a LPG stream forming main product of exemplary process 100. In an exemplary embodiment, bottoms $C_3^+$-rich stream 142 may contain ultra-low amounts of $C_1$ and $C_2$. In an exemplary embodiment, bottoms $C_3^+$-rich stream 142 may contain an amount of $C_1$ and $C_2$ in a range of about 0.5% to about 10%. In an exemplary embodiment, exemplary process 100 may be done iteratively in a cycle up to obtain a content of $C_1$ and $C_2$ in a range of about 0.5% to about 10% in bottoms $C_3^+$-rich stream 142 withdrawn from reboiler unit 140. In an exemplary embodiment, an amount of $C_1$ and $C_2$ compounds, and more specifically, an amount of $C_2$ compounds in produced bottoms $C_3^+$-rich stream 142 may be controlled and adjusted by adjusting a temperature of reboiler unit 140.

Figure 1B:
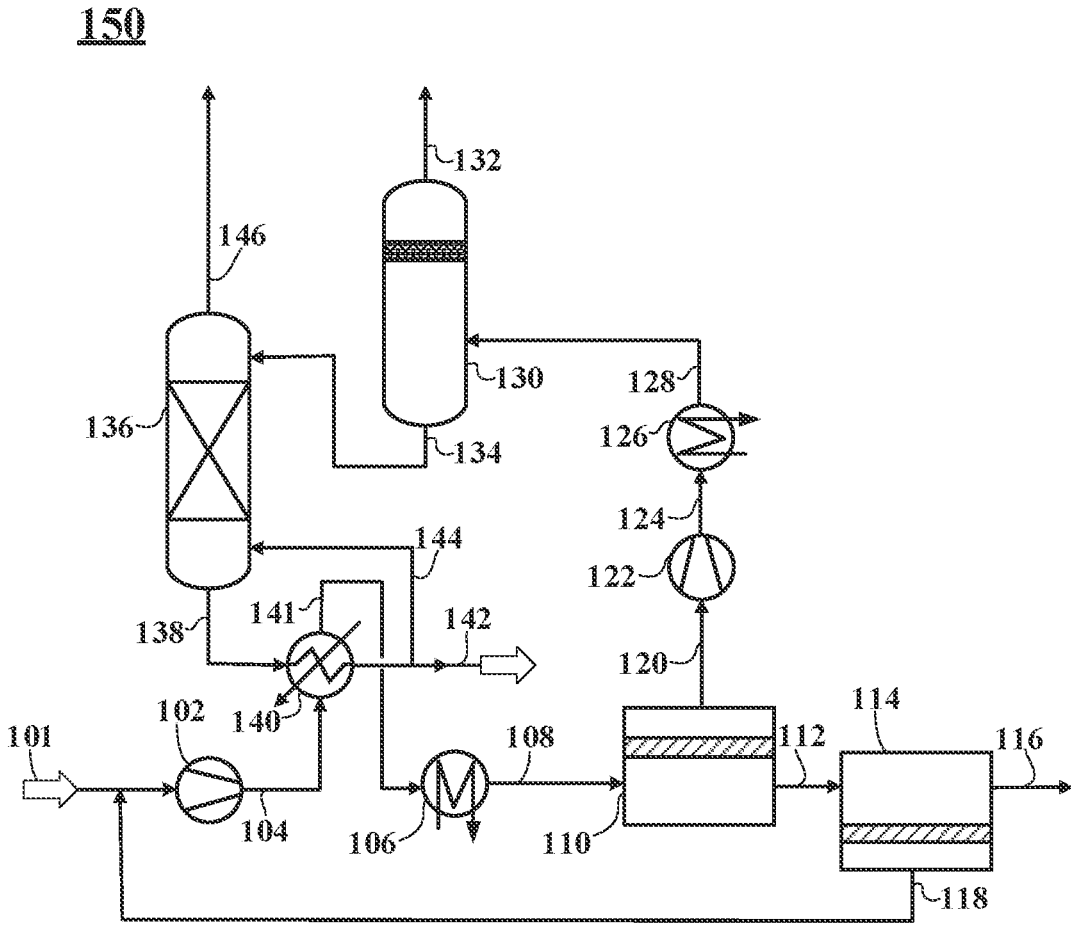
FIG. 1B shows a schematic view of an exemplary second process for recovery of $C_3^+$ hydrocarbons form an exemplary feed gas using an exemplary compressed feed gas as an exemplary heat source in an exemplary reboiler unit by transferring thermal energy of an exemplary compressed feed gas to an exemplary withdrawn liquid stream from bottom of an exemplary distillation column, consistent with one or more exemplary embodiments of the present disclosure.

FIG. 1B shows a schematic view of a second process 150 for recovery of $C_3^+$ hydrocarbons form a feed gas 101 using compressed feed gas 104 as a heat source in reboiler unit 140 by transferring thermal energy of compressed feed gas 104 to withdrawn liquid stream 138 from bottom of distillation column 136, consistent with one or more exemplary embodiments of the present disclosure. In an exemplary embodiment, exemplary process 150 may contain elements and steps similar to exemplary process 100 while further including using a thermal energy of compressed feed gas 104 for boiling liquid stream 138 in reboiler unit 140. In an exemplary embodiment, thermal energy of compressed feed gas 104 may be transferred to liquid stream 138 in reboiler unit 140; thereby, no external heat source may be required for reboiler unit 140. In addition, temperature of compressed feed gas 104 may be dropped in reboiler unit 140 by cooling compressed feed gas 104 there. In an exemplary embodiment, decreasing a temperature of compressed feed gas 104 may include transferring thermal energy of compressed feed gas 104 to withdrawn liquid stream 138 in reboiler unit 140 by passing compressed feed gas 104 through reboiler unit. In an exemplary embodiment, transferring thermal energy of compressed feed gas 104 to withdrawn liquid stream 138 in reboiler unit 140 may include boiling withdrawn liquid stream 138 in reboiler unit 140 using thermal energy of compressed feed gas 104 by passing compressed feed gas 104 through a hot side of reboiler unit 140 and passing withdrawn liquid stream 138 through a cold side of reboiler unit 140.

In another exemplary embodiment, decreasing a temperature of compressed feed gas 104 may include adjusting a temperature of compressed feed gas 104 in a temperature range of about 25° C. to about 35° C. may include a two-step cooling of compressed feed gas 104, including transferring thermal energy of compressed feed gas 104 to withdrawn liquid stream 138 in reboiler unit 140 by passing compressed feed gas 104 through reboiler unit, and then passing compressed feed gas 104 through first heat exchanger 106. In such embodiments, primary-cooled compressed feed gas 141 may be withdrawn from reboiler unit 140 and may be cooled to a temperature in a range of about 25° C. to about 35° C. via a secondary cooling step in first heat exchanger 106.

Figure 1C:
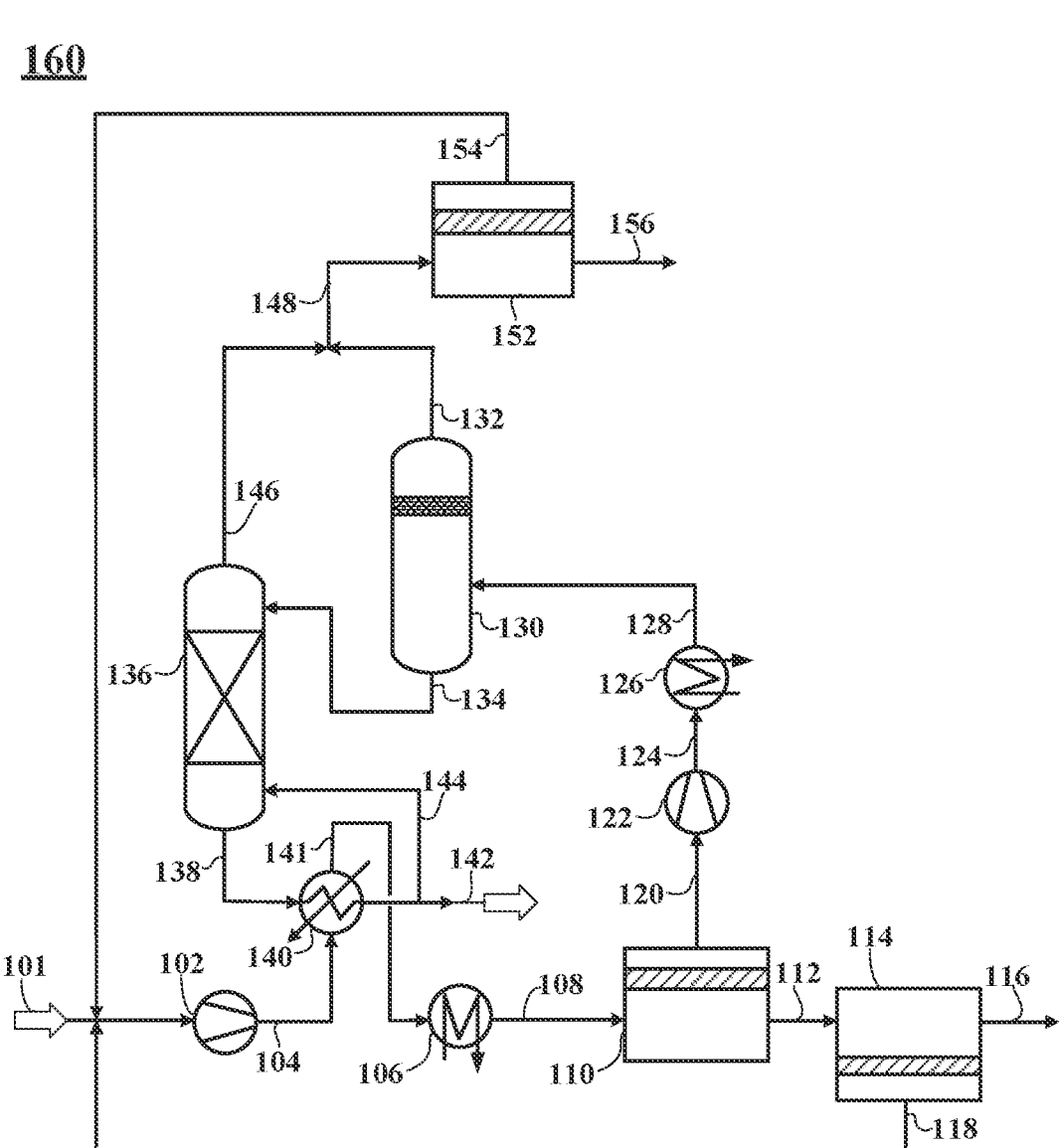
FIG. 1C shows a schematic view of an exemplary third process for recovery of $C_3$ hydrocarbons form an exemplary feed gas including an additional membrane step for depletion of $C_3^+$ from exemplary $C_1$- and $C_2$-rich product streams as much as possible, consistent with one or more exemplary embodiments of the present disclosure.

FIG. 1C shows a schematic view of a third process 160 for recovery of $C_3^+$ hydrocarbons form a feed gas 101 including an additional membrane step for depletion of $C_3^+$ from $C_1$- and $C_2$-rich product streams as much as possible, consistent with one or more exemplary embodiments of the present disclosure. In an exemplary embodiment, exemplary process 160 may contain elements and steps similar to exemplary process 100 and or exemplary process 150 while further including recovering a $C_3^+$ content remaining in vapor phase 132 discharged from separator unit 130 and vapor outlet 146 discharged from distillation column 136. In an exemplary embodiment, an exemplary $C_3^+$ content remaining in vapor phase 132 and vapor outlet 146 may be recovered by a separation process utilizing a third membrane module 152. In an exemplary embodiment, an overhead stream 148 may be formed by mixing vapor phase 132 discharged from separator unit 130 and vapor outlet 146 discharged from distillation column 136. It should be noted that thermodynamic conditions of vapor phase 132 exiting from separator unit 130 and vapor outlet 146 exiting from distillation column 136 may be very close to each other and they can be mixed together to form a feed stream to be fed to third membrane module 152. Furthermore, overhead stream 148 may be fed to third membrane module 152 where overhead stream 148 may be separated into a permeate stream 154 enriched in $C_3^+$ and a retentate stream comprising a third $C_1$- and $C_2$-rich stream 156 enriched in $C_1$ and $C_2$, and mainly enriched in $C_2$. In an exemplary embodiment, permeate stream 154 from third membrane module 152 may include a higher content of $C_3^+$ than each of vapor phase 132 exiting from separator unit 130 and vapor outlet 146 exiting from top of distillation column 136. In an exemplary embodiment, permeate stream 154 may be recycled to first membrane module 110. In an exemplary embodiment, recycling permeate stream 154 from third membrane module 152 to first membrane module 110 may include compressing permeate stream 154 to a pressure in a range of about 12 bar to about 18 bar, adjusting a temperature of compressed permeate stream 154 to a temperature in a range of about 25° C. to about 35° C., and feeding compressed permeate stream 154 at adjusted temperature to first membrane module 110. In an exemplary embodiment, recycling permeate stream 154 from third membrane module 152 to first membrane module 110 may include mixing permeate stream 154 with feed gas 101 before compressing feed gas 101.

In an exemplary embodiment, exemplary process 160 may further include retrieving a retentate stream from third membrane module 152 comprising third $C_1$- and $C_2$-rich stream 156. In an exemplary embodiment, third $C_1$- and $C_2$-rich stream 156 may include a stream having a higher content of $C_1$ and $C_2$ than overhead stream 148. In an exemplary embodiment, exemplary process 160 may further include forming a $C_1$- and $C_2$-rich product stream by mixing second and third $C_1$- and $C_2$-rich streams 116 and 156. In an exemplary embodiment, second $C_1$- and $C_2$-rich stream 116 and/or third $C_1$- and $C_2$-rich stream 156 may be used for domestic consumption and/or consuming as a fuel gas for process units, for example, boilers, etc.

Figure 2:
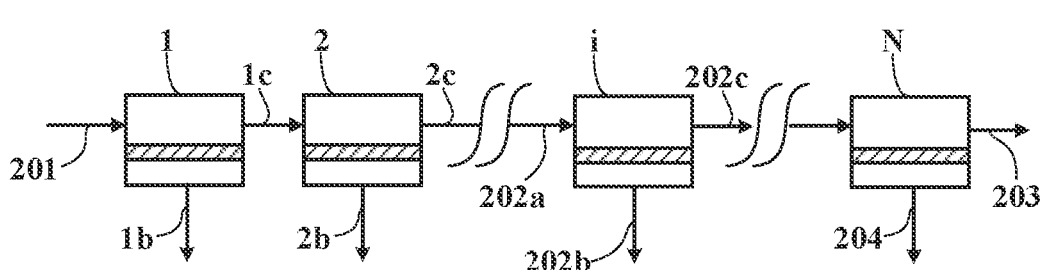
FIG. 2 shows a schematic view of an exemplary membrane module 200 for separation of a gas stream to a $C_3^+$-enriched stream and a $C_1$ and $C_2$ enriched stream, consistent with one or more exemplary embodiments of the present disclosure.

In an exemplary embodiment, each of first membrane module 110, second membrane module 114, and third membrane module 152 may include a set of membrane units placed sequentially after each other. FIG. 2 shows a schematic view of an exemplary membrane module 200 for separation of a gas stream to a $C_3^+$ enriched stream and a $C_1$- and $C_2$-rich stream, consistent with one or more exemplary embodiments of the present disclosure. In an exemplary embodiment, each of first membrane module 110, second membrane module 114, and third membrane module 152 may be similar to membrane module 200. In an exemplary embodiment, membrane module 200 may include a set of membrane units 1 to N (1, 2, . . . , i, . . . , and N). In an exemplary embodiment, a feed stream 201 may be fed to first membrane unit 1 to be separated into a permeate stream 1*b* enriched in $C_3^+$ relative to feed stream 201 and a retentate stream 1*c* enriched in $C_1$ and $C_2$ relative to feed stream 201. In an exemplary embodiment, a separation process similar to an exemplary separation process of first membrane 1 may be performed in each membrane unit i. In detail, a retentate stream 202*a* from a membrane unit i−1 may be fed to membrane unit i and may be separated into a permeate stream 202*b* enriched in $C_3^+$ relative to retentate stream 202*a* from membrane unit i−1 and a retentate stream 202*c* enriched in $C_1$ and $C_2$ relative to retentate stream 202*a* from a membrane unit i−1. In an exemplary embodiment, N permeate streams may be retrieved from respective N membrane units and may be mixed together, thereby a total permeate stream may be formed. In an exemplary embodiment, one or more permeate streams may be recycled to a membrane unit of membrane units of membrane module 200 for more recovery of $C_3^+$ compounds. In another exemplary embodiment, one or more retentate streams may be fed to a membrane unit of membrane units of membrane module 200 for more retrieving of $C_3^+$ compounds remaining in retentate streams. In an exemplary embodiment, each exemplary membrane unit i may include a permselective membrane. In an exemplary embodiment, an exemplary permselective membrane may include rubbery polymers. In an exemplary embodiment, an exemplary permselective membrane may be categorized in a group of reverse selective membranes. In an exemplary embodiment, an exemplary permselective membrane may be capable of separating vapors from super- critical gases.

Example 1: Permeation Properties of a Multicomponent Gas Mixture in Membrane Modules In this example, an experiment was carried out to deter- mine permeation properties of membrane modules used as examples of membrane modules first membrane module 110, second membrane module 114, and/or third membrane module 152 using a multicomponent gas mixture as feed stream with a composition presented in Table 1. Specifica- tions of retentate and permeate streams are also presented in Table 1.

TABLE 1

Specifications of membrane feed, retentate and permeate

| Component | Feed (mol %) | Permeate (mol %) | Retentate (mol %) |
|---|---|---|---|
| $C_1$ | 25.38 | 11.97 | 34.37 |
| $C_2$ | 20.97 | 19.03 | 22.27 |
| $C_3$ | 24.42 | 28.11 | 21.95 |
| $nC_4$ | 14.21 | 21.06 | 9.61 |
| $iC_4$ | 07.12 | 8.11 | 6.46 |
| $C_5^+$ | 6.56 | 10.33 | 4.04 |
| $CO_2$ | 1.34 | 1.39 | 1.30 |
| Flow rate ($Sm^3/h$) | 1,919 | 770 | 1,149 |

Membrane permeation properties of Table 1 were con- ducted at 30° C. while the feed and the permeate pressures were maintained at 15 and 3 bar, respectively. Moreover, based on the results of Table 1, a computer program was developed and used for the comparative examples presented herein. The permselective membranes used herein were rubbery polymers, which their performance can be catego- rized as reverse selective membranes. These membranes can separate vapors from supercritical gases. As results of Table 1 shows, heavy components ($C_3^+$) permeate through mem- brane to the permeate side while lighter gases like $C_1$ remain in upstream of the membrane module and their concentra- tion is increased in the retentate stream. Relatively low selectivity of heavy components compared to $C_2$ causes that the concentration of $C_2$ in permeate and retentate to be nearly equal to its concentration in the feed stream. Defi- ciency in decreasing concentration of $C_2$ in the permeate stream may cause some $C_2$ to be remained in the liquid LPG product. Presence of $C_2$ in the final product may increase its vapor pressure in the liquefaction process of LPG which is an undesirable phenomenon. Whereas, method described herein may be a suitable procedure to tackle this problem and to decrease concentration of $C_2$ in an exemplary final liquid LPG product. Therefore, an LPG product produced based on procedures presented herein may be a product with higher quality in comparison with those produced by com- mon LPG recovery processes.

Example 2: LPG Recovery from a Gas Stream

In this example, a process similar to exemplary process 160 described herein above was conducted for recovery of LPG from a feed gas stream. A feed gas stream containing $C_1$, $C_2$ and $C_{34}$ was used as feed gas 101. A process similar to exemplary process 160 was carried out for recovery of $C_3^+$ from the feed gas stream with three different scenarios for $C_2$ composition in bottoms $C_3^+$-rich stream 142. Mass flow rate of the feed gas stream was 3,155 kg/h and its composition was the same as those presented in Table 1. Specifications of the product streams are presented in Table 2. Product streams of each exemplary process includes a $C_3^+$ LPG stream similar to bottoms $C_3^+$-rich stream 142, a $C_1$-rich stream similar to second $C_1$- and $C_2$-rich stream 116, and a $C_2$-rich stream similar to third $C_1$- and $C_2$-rich stream 156.

TABLE 2

Specifications of the obtained product streams with three different scenarios for $C_2$ composition in LPG product (0.5, 5, and 10 mol %)

| Example | Stream | $C_1$ | $C_2$ | $C_3$ | $nC_4$ | $iC_4$ | $C_5^+$ | $CO_2$ | Flow |
|---|---|---|---|---|---|---|---|---|---|
| | | | | mol % | | | | | kg/h |
| 1 | $C_1$-Rich Stream | 47.29 | 30.56 | 14.62 | 1.98 | 3.19 | 0.52 | 1.84 | 894.9 |
| | $C_2$-Rich Stream | 31.14 | 41.56 | 18.75 | 2.55 | 2.61 | 0.47 | 2.92 | 503.8 |
| | $C_3^+$ LPG Stream | 0.00 | 0.50 | 37.38 | 32.75 | 13.48 | 15.89 | 0.00 | 1756.3 |
| | $C_3^+$ wt % Recovered = 77.58 Compressor Power = 311 kW | | | | | | | | |
| 2 | $C_1$-Rich Stream | 53.95 | 29.31 | 10.49 | 0.89 | 3.04 | 0.39 | 1.93 | 721.0 |
| | $C_2$-Rich Stream | 32.64 | 42.10 | 17.63 | 1.77 | 2.36 | 0.22 | 3.28 | 486.9 |
| | $C_3^+$ LPG Stream | 0.00 | 5.00 | 37.74 | 30.14 | 12.64 | 14.48 | 0.00 | 1946.7 |
| | $C_3^+$ wt % Recovered = 85.98 Compressor Power = 315 kW | | | | | | | | |
| 3 | $C_1$-Rich Stream | 53.74 | 28.62 | 11.25 | 1.04 | 2.84 | 0.14 | 2.37 | 763.7 |
| | $C_2$-Rich Stream | 39.34 | 38.91 | 15.02 | 1.33 | 2.04 | 0.16 | 3.20 | 325.9 |

TABLE 2-continued

| | | Specifications of the obtained product streams with three different scenarios for $C_2$ composition in LPG product (0.5, 5, and 10 mol %) | | | | | | | |
|---|---|---|---|---|---|---|---|---|---|
| Example | Stream | $C_1$ | $C_2$ | $C_3$ | $nC_4$ mol % | $iC_4$ | $C_5^+$ | $CO_2$ | Flow kg/h |
| | $C_3^+$ LPG Stream | 0.00 | 10.00 | 37.06 | 27.85 | 11.82 | 13.26 | 0.01 | 2065.4 |

$C_3^+$ wt % Recovered = 91.21
Compressor Power = 318 kW

In detail, the feed gas stream was compressed to 15 bar and its temperature was adjusted to 30° C. Then, the feed gas stream was fed to a first membrane module similar to first membrane module 110. A retentate stream from the first membrane module entered a second membrane module similar to second membrane module 114 and was enriched in $C_1$ and $C_2$ light compounds, particularly in $C_1$. The second membrane module may considerably affect overall LPG recovery of an exemplary process. A permeate stream of the second membrane module at 5 bar was recycled to feed compression unit and fed again to the first membrane module. A permeate stream of the first membrane unit is rich in $C_3^+$ heavy compounds. The permeate stream of the first membrane unit at 5 bar was fed to a compression unit to increase its pressure to 15 bar. The compressed permeate stream of the first membrane unit became a two-phase stream after passing through a heat exchanger and reducing its temperature to 30° C. Liquid and vapor phases of the two-phase stream were separated in a two-phase (vapor-liquid) separator similar to separator unit 130 at a constant temperature of 30° C. The liquid phase exiting the separator was fed to a distillation column similar to distillation column 136. A reboiler, similar to reboiler unit 140, at bottom of the distillation column working at a temperature range of 55-75° C. generated a vapor flow, which returns to the distillation column to drive a distillation separation process. Vapor streams from the two-phase separator and top of the distillation column were mixed together and formed a feed stream of a third membrane module similar to third membrane module 152. It should be noted that thermodynamic conditions of the vapor phase exiting from the two-phase separator and the distillation column were very close to each other and they were mixed together to form the feed of the third membrane unit. A retentate stream from the third membrane module was enriched in $C_1$ and $C_2$ compounds, and a permeate stream of this module recovered $C_3^+$ compounds. The permeate stream from the third membrane module formed a return flow that was fed to the feed compression unit. The retentate streams of the second and third membrane modules were enriched in light compounds ($C_1$). Each of these two streams can be considered as a process product. Of course, it is also possible to form a single process product by mixing these two streams. A liquid stream exiting the reboiler at bottom of the distillation column was rich in $C_3^+$ compounds, which formed the liquid LPG product. An amount of $C_1$ and $C_2$ compounds (especially $C_2$) in the produced LPG liquid was controlled by adjusting the temperature of the reboiler at bottom of the distillation column. Surface of the second membrane module was a factor which controlled an amount of $C_3$ recovery. Furthermore, the energy needed in the reboiler at bottom of the distillation column was supplied from discharge stream of the feed compression unit, leading to minimizing total thermal energy consumption of an exemplary process.

Hence, heat load of an after-cooler exchanger of the feed compression unit was reduced by heat absorbed in the reboiler of the distillation column.

Examples presented in Table 2 shows that from a feed stream with a predetermined composition, three liquid LPG products with different compositions may be produced. Such flexibility in composition of final product provides a capability of producing customized final product according to the request of a customer which is an important advantage for an LPG recovery process using an exemplary process disclosed here.

Cases of 1, 2, and 3 presented in Table 2 show three different conditions to produce three different liquid LPG products in which composition of $C_2$ is 0.5, 5, and 10 mol %, respectively. It is worth mentioning that vapor pressure of LPG product is largely affected by presence of $C_2$ due to its low molecular weight and consequently high volatility. Meanwhile, as data of Table 2 shows, concentration of $C_1$ in all three products is nearly negligible. Based on the content of $C_2$, LPG product of case 1 has the lowest vapor pressures and LPG product of case 3 has the highest vapor pressure. Therefore, product produced in case 1 is a product with higher quality compared to those presented in cases 2 and 3.

Furthermore, results of Table 2 shows that producing a high quality LPG product with low content of $C_2$ results in reduction of recovery of $C_3$. Albeit, it should be noted that compression requirements of these three cases are nearly the same and reducing the content of $C_2$ in the final product directly affects and reduces recovery of an exemplary plant. As it may be seen, reduction in recovery rate in operation conditions may be realized through tracking an increase in mass of $C_1$-rich stream and $C_2$-rich stream.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments. This is for purposes of streamlining the disclosure, and is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments have been described, the description is intended to be exemplary, rather than limiting and it will be apparent to those of ordinary skill in the art that many more embodiments and embodiments are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A process for recovery of $C_3^+$ hydrocarbons from gas streams containing $C_1$, $C_2$ and $C_3^+$, the process comprising:

compressing a feed gas containing $C_1$, $C_2$ and $C_3^+$ to a pressure of 15 bar;

adjusting temperature of the compressed feed gas to a temperature of 30° C.;

feeding the compressed feed gas to a first membrane module;

retrieving a permeate stream comprising a first $C_3^+$-rich stream from the first membrane module, the first $C_3^+$-rich stream comprising a higher content of $C_3^+$ than the feed gas;

retrieving a retentate stream comprising a first $C_1$- and $C_2$-rich stream from the first membrane module, the first $C_1$- and $C_2$-rich stream comprising a higher content of $C_1$ and $C_2$ than the feed gas;

recycling a remaining amount of $C_3^+$ in the first $C_1$- and $C_2$-rich stream by enriching the $C_1$- and $C_2$-rich stream in a second membrane module, comprising:

feeding the first $C_1$- and $C_2$-rich stream to the second membrane module;

retrieving a retentate stream comprising a second $C_1$- and $C_2$-rich stream from the second membrane module, the second $C_1$- and $C_2$-rich stream comprising a higher content of $C_1$ and $C_2$ than the first $C_1$- and $C_2$-rich stream;

extracting a second $C_3^+$-rich stream from the second membrane module, the second $C_3^+$-rich stream comprising a permeate stream from the second membrane module; and recycling the second $C_3^+$-rich stream to the first membrane module by mixing the second $C_3^+$-rich stream with the feed gas;

compressing the first $C_3^+$-rich stream to a pressure of 15 bar;

forming a two-phase stream by cooling the compressed first $C_3^+$-rich stream to a temperature of 30° C.;

separating the two-phase stream to a liquid phase of the two-phase stream and a vapor phase of the two-phase stream in a separator unit at a constant temperature of 30° C., the liquid phase of the two-phase stream forming a separator-liquid $C_3^+$-rich stream comprising a higher content of $C_3^+$ than the first $C_3^+$-rich stream;

removing volatile compounds from the separator-liquid $C_3^+$-rich stream, comprising:

feeding the separator-liquid $C_3^+$-rich stream to a distillation column;

performing a distillation process in the distillation column, comprising:

withdrawing a liquid stream from a bottom of the distillation column;

generating a vapor flow by heating the withdrawn liquid stream in a reboiler unit to a temperature in a range of 55° C. to 75° C. using the compressed feed gas as a thermal energy source, the vapor flow comprising the volatile compounds of the separator-liquid $C_3^+$-rich stream; and returning the generated vapor flow to the distillation column; and withdrawing a bottoms $C_3^+$-rich stream comprising a liquid flow from the reboiler unit, the liquid flow comprising non-volatile compounds of the separator-liquid $C_3^+$-rich stream with a higher content of $C_3^+$ than the separator-liquid $C_3$f-rich stream; and recovering a $C_3^+$ content remaining in the vapor phase of the two-phase stream and a vapor outlet from a top of the distillation column, comprising:

forming an overhead stream by mixing the vapor phase of the two-phase stream and the vapor outlet from the top of the distillation column;

feeding the overhead stream to a third membrane module; and recycling a permeate stream from the third membrane module to the first membrane module by mixing the permeate stream from the third membrane module with the feed gas.

2. The process of claim 1, wherein adjusting the temperature of the compressed feed gas comprises:

cooling the compressed feed gas stream in the reboiler unit by transferring thermal energy of the compressed feed gas to the withdrawn liquid stream in the reboiler unit via boiling the withdrawn liquid stream in the reboiler unit using thermal energy of the compressed feed gas by passing the compressed feed gas through a hot side of the reboiler unit and passing the withdrawn liquid stream through a cold side of the reboiler unit, and adjusting the temperature of the compressed feed gas at a temperature in the range of 25° C. to 35° C. by further cooling the compressed feed gas in a heat exchanger unit using a coolant fluid.

3. The process of claim 1, wherein the process is done iteratively in a cycle up to obtain a content of $C_2$ in a range of 0.5 to 10 mol. % in the bottoms $C_3^+$-rich stream withdrawn from the reboiler unit.

4. The process of claim 1, further comprising forming a $C_1$- and $C_2$-rich product stream, comprising:

retrieving a retentate stream comprising a third $C_1$- and $C_2$-rich stream from the third membrane module, the third $C_1$- and $C_2$-rich stream comprising a higher content of $C_1$ and $C_2$ than the overhead stream; and obtaining the $C_1$- and $C_2$-rich product stream by mixing the second $C_1$- and $C_2$-rich stream and the third $C_1$- and $C_2$-rich stream.

5. A process for recovery of $C_3^+$ hydrocarbons from streams containing $C_1$, $C_2$ and $C_3^+$, the process comprising:

compressing a feed gas containing $C_1$, $C_2$ and $C_3^+$ to a pressure in a range of 12 bar to 18 bar;

adjusting a temperature of the compressed feed gas to a temperature in a range of 25° C. to 35° C.;

forming a first $C_3^+$-rich stream with a higher content of $C_3^+$ than the feed gas by passing the compressed feed gas through a first membrane module, passing the compressed feed gas through the first membrane module comprising:

feeding the compressed feed gas to the first membrane module;

retrieving a permeate stream comprising the first $C_3^+$-rich stream from the first membrane module; and retrieving a retentate stream comprising a first $C_1$- and $C_2$-rich stream from the first membrane module, the first $C_1$- and $C_2$-rich stream comprising a higher content of $C_1$ and $C_2$ than the feed gas;

recycling a remaining amount of $C_3^+$ in the first $C_1$- and $C_2$-rich stream by enriching the first $C_1$- and $C_2$-rich stream in a second membrane module, comprising:

feeding the first $C_1$- and $C_2$-rich stream to the second membrane module;

retrieving a retentate stream comprising a second $C_1$- and $C_2$-rich stream from the second module, the second $C_1$- and $C_2$-rich stream comprising a higher content of $C_1$ and $C_2$ than the first $C_1$- and $C_2$-rich stream, extracting a second $C_3^+$-rich stream from the first $C_1$- and $C_2$-rich stream by retrieving a permeate stream from the second membrane module; and recycling the second $C_3^+$-rich stream to the first membrane module;

compressing the first $C_3^+$-rich stream to a pressure in a range of 12 bar to 18 bar;

forming a two-phase stream by cooling the compressed first $C_3^+$-rich stream to a temperature in a range of 25° C. to 35° C., the two-phase stream comprises a vapor-liquid $C_3^+$-rich stream;

separating the two-phase stream to a separator-liquid $C_3^+$-rich stream and a vapor phase in a separator unit at a constant temperature in a range of 25° C. to 35° C., the separator-liquid $C_3^+$-rich stream comprising the liquid phase of the two-phase stream with a higher content of $C_3^+$ than the first $C_3^+$-rich stream; and forming a bottoms $C_3^+$-rich stream with a higher content of $C_3^+$ than the separator-liquid $C_3^+$-rich stream by removing volatile compounds from the separator-liquid $C_3^+$-rich stream, removing volatile compounds from the separator-liquid $C_3^+$-rich stream comprising:

feeding the separator-liquid $C_3^+$-rich stream to a distillation column;

performing a distillation process in the distillation column, comprising:

withdrawing a liquid stream from a bottom of the distillation column;

generating a vapor flow by heating the withdrawn liquid stream in a reboiler unit to a temperature in a range of 55° C. to 75° C., the vapor flow comprising the volatile compounds of the separator-liquid $C_3^+$-rich stream; and returning the generated vapor flow to the distillation column; and obtaining the bottoms $C_3^+$-rich stream by withdrawing a liquid flow from the reboiler unit, the liquid flow comprising non-volatile compounds of the separator-liquid $C_3^+$-rich stream with a higher content of $C_3^+$ than the separator-liquid $C_3^+$-rich stream.

6. The process of claim 5, wherein adjusting the temperature of the compressed feed gas comprises:

primary cooling the compressed feed gas stream in the reboiler unit by transferring thermal energy of the compressed feed gas to the withdrawn liquid stream in the reboiler unit via passing the compressed feed gas through a hot side of the reboiler unit and passing the withdrawn liquid stream through a cold side of the reboiler unit; and adjusting the temperature of the compressed feed gas at a temperature in the range of 25° C. to 35° C. by further cooling the compressed feed gas in a heat exchanger unit using a coolant fluid.

7. The process of claim 5, wherein recycling the second $C_3^+$-rich stream to the first membrane module comprises:

compressing the second $C_3^+$-rich stream to a pressure in a range of 12 bar to 18 bar;

adjusting a temperature of the compressed second $C_3^+$-rich stream to a temperature in a range of 25° C. to 35° C.; and feeding the compressed second $C_3^+$-rich stream to the first membrane module.

8. The process of claim 5, wherein recycling the second $C_3^+$-rich stream to the first membrane module comprises mixing the second $C_3^+$-rich stream with the feed gas before compressing the feed gas.

9. The process of claim 5, wherein the process is done iteratively in a cycle up to obtain a content of $C_2$ in a range of 0.5 to 10 mol. % in the bottoms $C_3^+$-rich stream withdrawn from the reboiler unit.

10. The process of claim 5, wherein forming the two-phase stream comprises:

passing the compressed first $C_3^+$-rich stream through a heat exchanger unit; and reducing the temperature of the compressed first $C_3^+$-rich stream to the temperature in the range of 25° C. to 35° C. in the heat exchanger unit using a coolant fluid.

11. The process of claim 5, wherein separating the two-phase stream to the separator-liquid $C_3^+$-rich stream and the vapor phase in the separator unit comprises:

feeding the two-phase stream to the separator unit;

withdrawing the separator-liquid $C_3^+$-rich stream comprising a liquid phase of the two-phase stream from a bottom of the separator unit; and withdrawing the vapor phase of the two-phase stream from a top of the separator unit, the vapor phase of the two-phase stream comprising a higher content of $C_1$ and $C_2$ than the first $C_3^+$-rich stream, wherein a temperature of the separator unit is constant at a temperature in the range of 25° C. to 35° C. and equal to a temperature of the two-phase stream.

12. The process of claim 5, further comprising recovering a $C_3^+$ content remaining in the vapor phase of the two-phase stream and a vapor outlet from a top of the distillation column, comprising:

forming an overhead stream by mixing the vapor phase of the two-phase stream and the vapor outlet from the top of the distillation column;

feeding the overhead stream to a third membrane module; and recycling a permeate stream from the third membrane module to the first membrane module, the permeate stream from the third membrane module comprising a higher content of C than each of the vapor phase of the two-phase stream and the vapor outlet from the top of the distillation column.

13. The process of claim 12, wherein recycling the permeate stream from the third membrane module to the first membrane module comprises:

compressing the permeate stream from the third membrane module to a pressure in a range of 12 bar to 18 bar, adjusting a temperature of the compressed permeate stream from the third membrane module to a temperature in a range of 25° C. to 35° C.; and feeding the compressed permeate stream from the third membrane module to the first membrane module.

14. The process of claim 12, wherein recycling the permeate stream from the third membrane module to the first membrane module comprises mixing the permeate stream from the third membrane module with the feed gas before compressing the feed gas.

15. The process of claim 12, further comprising retrieving a retentate stream from the third membrane module comprising a third $C_1$- and $C_2$-rich stream, the third $C_1$- and $C_2$-rich stream comprising a higher content of $C_1$ and $C_2$ than the overhead stream.

16. The process of claim 15, further comprising forming a $C_1$- and $C_2$ rich product stream by mixing the second $C_1$- and $C_2$-rich stream and the third $C_1$- and $C_2$-rich stream.

17. The process of claim 12, wherein feeding the overhead stream to the third membrane module comprises feeding the overhead stream to a set of rubbery polymer membranes placed sequentially after each other.

18. The process of claim 5, wherein passing the compressed feed gas through the first membrane module comprises passing the compressed feed gas stream through a set of rubbery polymer membranes placed sequentially after each other.

19. The process of claim 5, wherein feeding the first $C_1$- and $C_2$-rich stream to the second membrane module comprises feeding the $C_1$- and $C_2$ rich stream to a set of rubbery polymer membranes placed sequentially after each other.

* * * * *